United States Patent [19]

Mohn

[11] Patent Number: 4,708,194

[45] Date of Patent: Nov. 24, 1987

[54] METHOD AND APPARATUS FOR RAPIDLY SOLIDIFYING METAL EMPLOYING A METALLIC CONDITIONING BRUSH

[75] Inventor: Walter R. Mohn, Simpsonville, S.C.

[73] Assignee: Allied Corporation, Morris Township, Morris County, N.J.

[21] Appl. No.: 287,338

[22] Filed: Jul. 27, 1981

[51] Int. Cl.⁴ .................... B22D 11/06; B22D 11/07
[52] U.S. Cl. ................................. 164/463; 164/72; 164/158; 164/423; 164/429; 164/472; 164/479
[58] Field of Search ................. 164/72, 121, 463, 479, 164/429, 423, 472, 158; 427/11, 135; 118/76, 77

[56] References Cited

U.S. PATENT DOCUMENTS

| | | | |
|---|---|---|---|
| 2,914,425 | 11/1959 | McGuire | 427/11 |
| 3,132,043 | 5/1964 | Clayton | 427/11 X |
| 4,142,571 | 3/1979 | Narasimhan | 164/437 X |
| 4,149,884 | 4/1979 | Maringer et al. | 164/463 X |
| 4,184,532 | 1/1980 | Bedell et al. | 164/463 |

FOREIGN PATENT DOCUMENTS 2114375 10/1972 Fed. Rep. of Germany ........ 427/11
22405 of 1898 United Kingdom .................. 427/11

OTHER PUBLICATIONS

"An Experimental Method for the Casting of Rapidly Quenched Filaments and Fibers" by R. E. Maringer et al.

Primary Examiner—Nicholas P. Godict
Assistant Examiner—J. Reed Batten, Jr.
Attorney, Agent, or Firm—Gerhard H. Fuchs; Ernest D. Buff

[57] ABSTRACT

The present invention discloses an improved rapid solidification casting system which employs one or more metal conditioning brushes. The casting surface is cleaned by the brushes and the pressure on the brushes is adjusted so as to deposit a layer of the brush metal onto the casting surface, the casting surface so conditioned increases the quality of the resulting cast material.

7 Claims, 4 Drawing Figures

METHOD AND APPARATUS FOR RAPIDLY SOLIDIFYING METAL EMPLOYING A METALLIC CONDITIONING BRUSH

FIELD OF THE INVENTION

The present invention relates to an apparatus and a method for continuously conditioning a rapid solidification casting surface, and more particularly to the use of a metal brush for removing contaminates and depositing a smooth metallic layer onto the casting surface.

BACKGROUND ART

During continuous rapid solidification on a chill surface, oxides and other contaminates can accumulate on the chill surface. These contaminates will degrade the casting surface, and ultimately may disrupt the casting process. R. E. Maringer et al., in an article entitled, "An Experimental Method for the Casting of Rapidly Quenched Filaments and Fibers", employ a rotating flapper wheel made from "fiberglass, cotton, plastic belting, or any other material which will keep the surface in good condition without leaving a deposit of its own". The Maringer device may be ineffective when hard, tenacious oxides or other contaminates are deposited which cannot be removed from the chill surface without mechanically abrading or metallurgically upsetting the surface. Gouging or scrapping associated with removing tenacious contaminates will roughen the chill surface and thereby reduce the quality of the resulting ribbon or may make the production of continuous ribbon impossible.

U.S. Pat. No. 4,184,532 issued to Bedell et al. teaches employing a brush, not for the purpose of conditioning the wheel, but in place of a fluid jet, for stripping the ribbon from the casting surface.

SUMMARY OF THE INVENTION

The present invention is an improved apparatus and method for casting onto a chill surface to continuously form a rapidly solidified ribbon. The improvement, comprising at least one metal brush which contacts the chill surface, removes contaminates, and friction welds a smooth, metallurgically clean, and thermally conductive layer of the brush metal onto the chill surface.

BEST MODE OF CARRYING THE INVENTION INTO PRACTICE

Figure 1:
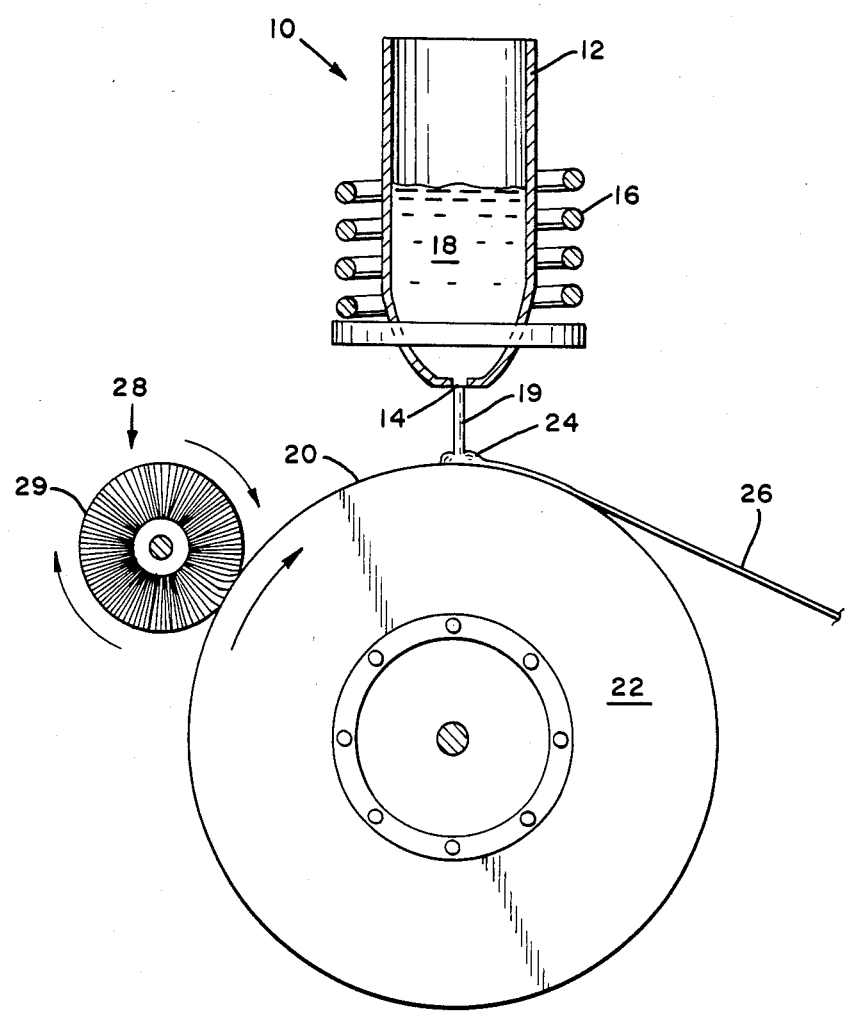
FIG. 1 is a schematic representation of one embodiment of the present invention where a conditioning brush is used in conjunction with a jet caster.

One embodiment of the present invention which employs a jet caster 10 is illustrated in FIG. 1. The jet caster 10 has a crucible 12 with an orifice 14. A heating source 16 maintains molten metal 18 in the crucible 12. The molten metal 18 passes through the orifice 14 to form a jet of molten metal 19 which impinges on a chill surface 20. As illustrated in FIG. 1, the chill surface 20 is the peripheral rim of a rotating wheel 22. A puddle 24 of molten metal forms where the jet 19 impacts the chill surface 20. As the wheel 22 rotates, a metallic ribbon 26 is formed. When the length of the casting is short, a high quality ribbon can be obtained by the technique described above, however, as the length of the casting increases, it has been found that the chill surface 20 degrades. This degradation can occur by portions of the ribbon 26 fusing to the chill surface 20, by the ribbon 26 tearing away some of the chill surface material, or by formation of oxides and other contaminates on the chill surface 20. Contaminates can dramatically reduce the heat transfer from the molten metal puddle 24, and contaminates can change the wetting characteristics of the chill surface 20.

It has been found that the above-mentioned problems can be overcome by incorporation into the jet casting system 10 at least one metal conditioning brush 28 which contacts the chill surface 20. The conditioning brush 28 has metal filaments 29 preferably made from a softer metal than the chill surface 20. For example, a brush with brass filaments would be appropriate for a steel or a Be-Cu wheel, while a brush with Nickel Silver (65Cu23Zn-12Ni by weight) filaments would be appropriate for an OFHC copper wheel.

Figure 2:
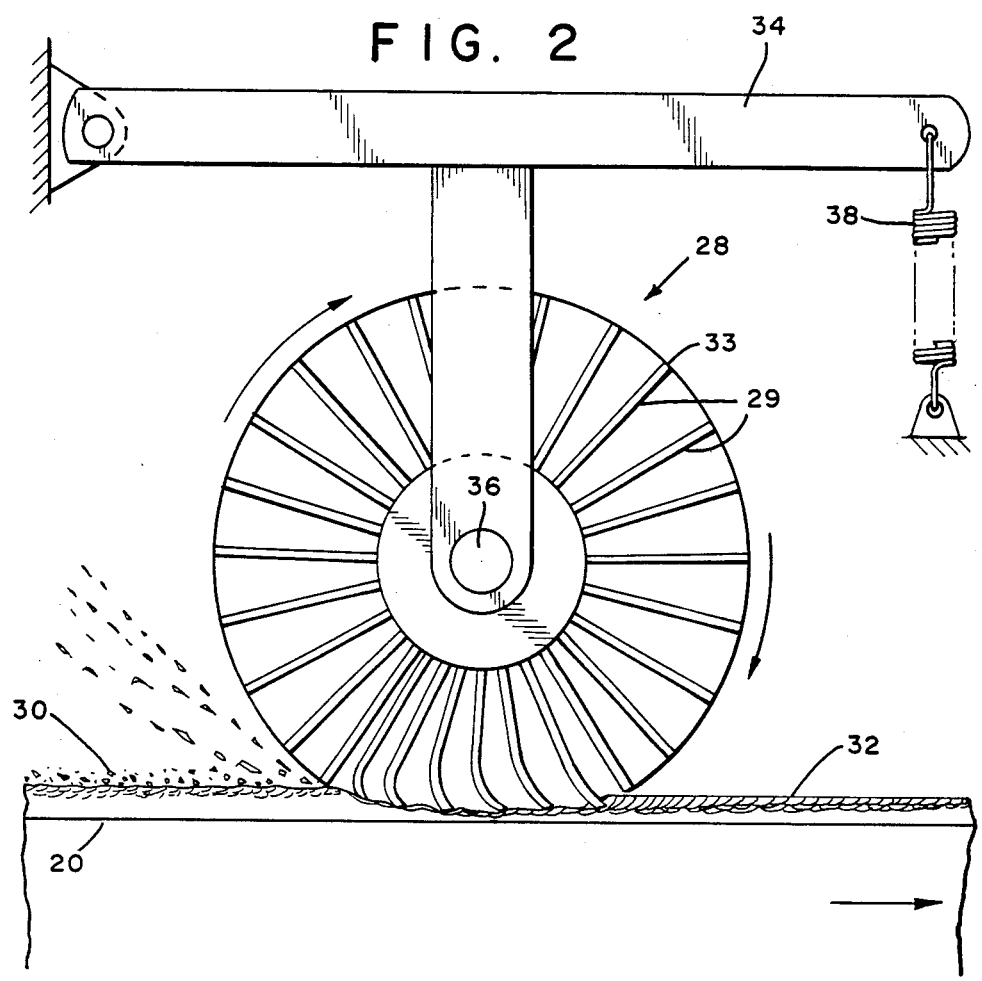
FIG. 2 is a schematic representation of the operation which results from the use of the conditioning brushes of the present invention.

FIG. 2 illustrates the interaction of the conditioning brush 28 with the chill surface 20. The conditioning brush 28 establishes a chill surface conditioning sequence beneficial to continuous rapid solidification casting of a ribbon 26 by dislodging and removing contaminates 30 such as oxides and swarf from the chill surface 20 and by re-depositing a smooth, metallurgically clean layer 32 of the conditioning brush metal on the chill surface 20. The conditioning brush 28 assures a stable molten metal puddle 24 by maintaining a continuously smooth, clean, chill surface 20.

A succession of conditioning brushes may establish a more effective cleaning and deposition sequence for long runs.

The relative motion and pressure at the metal brush filament tips 33 causes the tips 33 to contact and rub against the chill surface 20, upsetting the surface, dislodging contaminates 30 such as oxides, removing the peaks or other surface irregularities, and friction welding a layer 32 of the filament tip material. The pressure between the conditioning brush 28 and the chill surface 20 at the brush filament tips 33 is sufficient to cause metal fragments to be transferred and friction welded to the chill surface 20. The pressure may be maintained by various means, such as spring loading the conditioning brush 28 to maintain a continuous constant pressure against the chill surface. A pivotal mounted beam 34 can be attached to the conditioning brush 28 via a rotating drive shaft 36. The beam 34 is biased with a spring 38 so as to assure that a pressure is maintained between the filament tips 33 and the chill surface 20.

The resulting friction welded layer 32 on the chill surface 20 is a smooth uniform, metallurgically clean continuous layer of brush metal.

The prior art wipers such as those taught by Maringer et al. will not remove the tenacious oxides or other contaminates 30. These contaminates 30 will substantially reduce the quality of the resulting ribbon 26. The contaminates may change the wetting characteristics of the chill surface 20, and this will tend to destabilize the puddle 24, reducing the quality of the resulting ribbon 26.

Abrasive wipers which remove tenacious oxides will roughen the chill surface 20; this roughening will produce a turbulent boundary layer which tends to destabilize the puddle 24.

Figure 3:
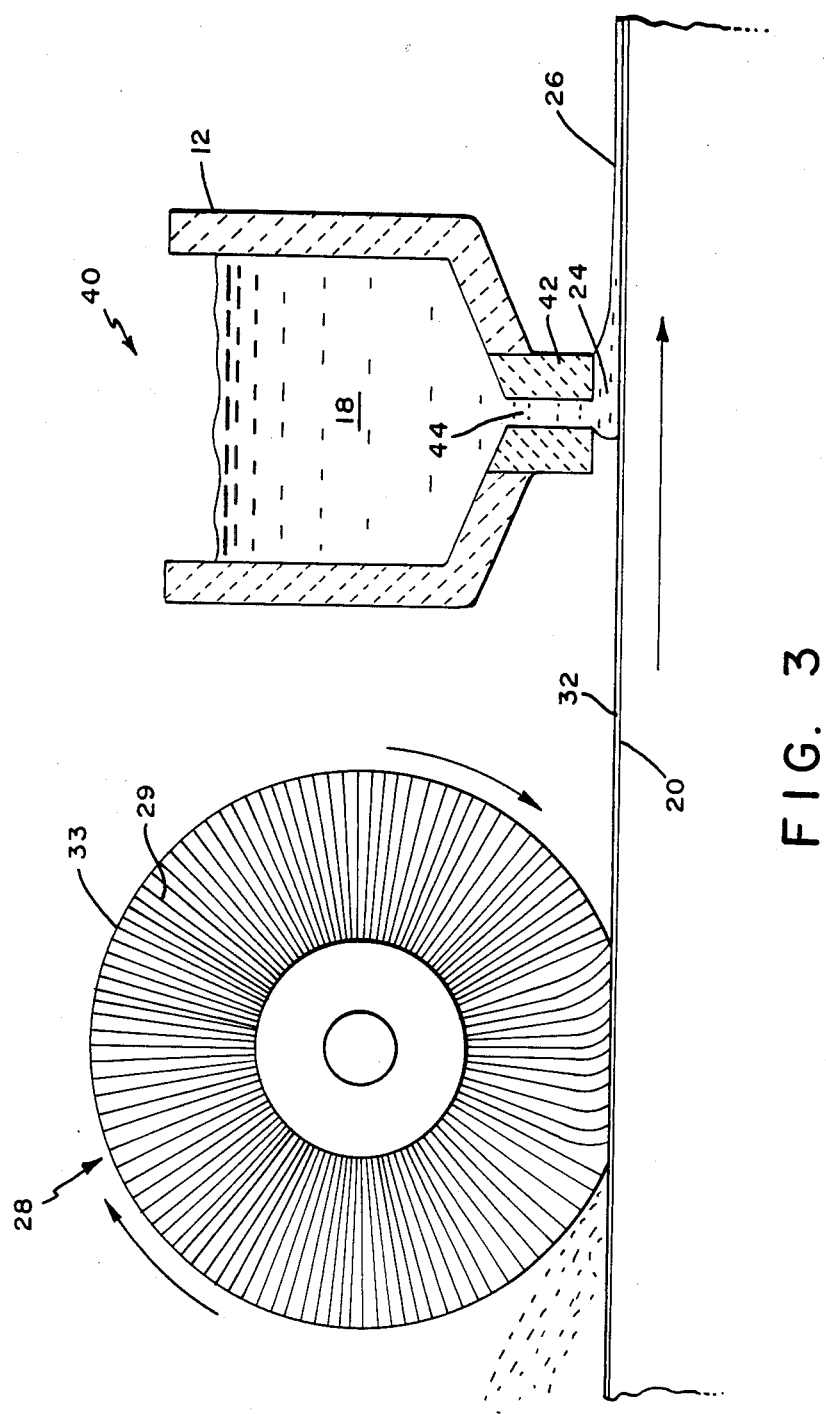
FIG. 3 is a schematic representation of a second embodiment of the present invention where a conditioning brush is used in conjunction with a planar flow caster.

A second embodiment of the present invention is illustrated in FIG. 3 where a planar flow caster 40 has been substituted for the jet caster 10. The planar flow caster 40 is further described in U.S. Pat. No. 4,142,571 issued to Narasimhan and is herein incorporated by reference.

When using the planar flow caster 40 the crucible 12 is fitted with a slotted nozzle 42 which is in close proximity to the chill surface 20. The molten metal 18 contained in the crucible 12 fills the slot 44 of the slotted nozzle 42 and is expelled onto the chill surface 20. The width of the ribbon 26 will be controlled by the length of the slot 44. To avoid degradation of the quality of the ribbon 26, a conditioning brush 28 is employed which contacts the chill surface 20 and deposits a metal layer 32 thereon.

In carrying the invention into practice molten metal 18 from the crucible 12 is transported to a moving chill surface 20 and forms a puddle 24 thereon. The moving chill surface 20 withdraws a solid ribbon 26 from the puddle 24 which is continuously replenished with molten metal 18 from the crucible 12. The filaments 29 of the metal conditioning brush(es) 28 are preferably of a softer metal than the chill surface 20. The brush(es) 28 are brought into contact with the chill surface 20 with sufficient pressure that a friction welded layer 32 of the brush metal is deposited on the chill surface 20 at a location before the puddle 24 is formed on the chill surface 20.

In order to illustrate the effectiveness of the use of a conditioning brush on quality of the resulting ribbon, the following test runs were made.

EXAMPLE I

About 10 lbs (4.54 kg) of alloy having the nominal composition of 89 Ni 11 P by weight was cast on the periphery of a 15 inch (37.5 cm) diameter OFHC copper wheel using a planar flow caster similar in configuration to the caster shown in FIG. 3. No conditioning brush was employed. The surface speed of the copper wheel was 3000 ft/min (90,000 cm/min). The nozzle slot configuration was 1 inch (2.5 cm) by 0.002 inches (0.005 cm).

Figure 4:
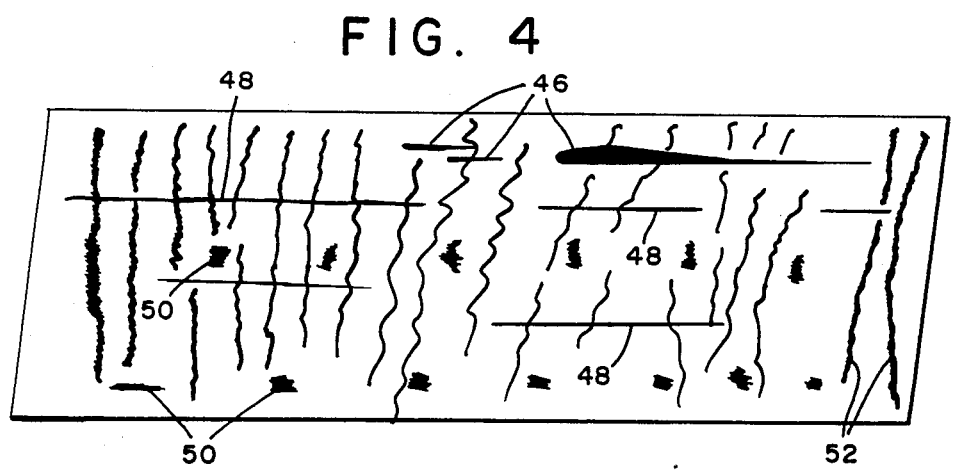
FIG. 4 is a schematic representation of a segment of a ribbon cast without the benefit of the conditioning brushes. The surface illustrated is the surface which is in contact with the chill surface.

The resulting ribbon was nominally 0.0012 inches (30 micro meters) thick and about 1 inch (2.5 cm) wide. The ribbon quality decreased during the course of the run due to degradation of the surface of the copper wheel. FIG. 4 is a schematic representation of a ribbon segment near the end of the run. The ribbon contained elongated holes 46, linear regions of reduced thickness 48, as well as localized thin zones 50. These imhomogeneities, as well as the instability patterns 52, which result from puddle instability during casting, produce thermal distortion of the ribbon by promoting non-uniform cooling.

EXAMPLE II

About 10 lbs (4.54 Kg) of alloy was cast as described in Example I, with the exception that a 3 inch (7.5 cm) diameter nylon conditioning brush was rotated at 1725 RPM in contact with the chill surface. The relative rotation of the wheel 22 and the brush 28 was as illustrated in FIG. 1.

The nylon brush, rather than cleaning the wheel, deposited a layer of nylon on the peripheral chill surface or the copper wheel. This nylon layer acted as a thermal barrier which limited the heat extraction from the liquid metal, as well as changed the wetting characteristics of the chill surface. These changes caused the puddle to become unstable, this in turn caused a disruption in the casting process.

EXAMPLE III

The conditions for casting were the same as for Example II with the exception that a three inch diameter brush having non-depositing natural organic filaments for bristles was employed rather than a brush having nylon filaments for bristles. The resulting ribbon was similar to the ribbon of Example I.

EXAMPLE IV

The conditions for casting were the same as for Example III except that a three inch diameter brush having steel filaments for bristles was employed. The chill surface of the copper casting wheel was severely scored by the steel bristles. The scratches caused turbulence on the chill surface and made casting of a ribbon impossible.

EXAMPLE V

The casting conditions were the same as for Example IV with the exception that a 6 inch (15 cm) diameter brush with steel bristles was substituted for the 3 inch (7.5 cm) brush of Example IV. The wheel was severely scratched making casting of the ribbon impossible.

EXAMPLE VI

The casting conditions of Example IV were employed with the exception that a three inch diameter brush having brass filaments for bristles was used. The chill surface of the copper casting wheel was scratched by the brush, however, the scratches were shallow and it was possible to cast a low quality ribbon. The ribbon had striations which resulted from the pattern of scratches left by the brush.

EXAMPLE VII

The conditions for casting were the same as in Example IV with the exception that a brush with Nickel Silver (65Cu-23Zn-12Ni by weight) bristles was employed. The brush was brought in contact with the chill surface and sufficient pressure was applied to deposit a visible layer on the surface of the copper wheel before casting was begun. The deposited layer was continuously replenished during casting. The resulting ribbon was free of holes and the surface of the ribbon had a matted appearance of uniform quality.

From examination of the above examples it becomes apparent that conditioning brushes which are hard and scratch the chill surface are detrimental to the casting process, while brushes which do not upset the surface will not remove tenacious contaminates, and these contaminates can degrade the quality of the cast ribbon. Only those brushes which can effectively upset the casting surface to remove contaminates and thereafter replenish the surface with a smooth, fresh metal surface will provide a casting surface that produces consistently high quality ribbon throughout the casting.

While the ribbon made in the above examples was cast on a wheel, it should be appreciated that the improvement discussed could also be applied to other casting surfaces, such as the surface used with a belt caster.

What I claim is:

1. A rapid solidification ribbon casting system having a caster for deposition of liquid metal on a moving chill surface, the improvement comprising:
 at least one conditioning brush which contacts the chill surface,
 said conditioning brush comprising bristles of a metal that will deposit said chill surface; and
 means for applying pressure to cause deposition of metal from said conditioning brush onto the casting surface.

2. The casting system of claim 1 wherein means for applying pressure to said brush is a spring.

3. The casting system of claim 1 wherein said bristles are made of a material softer than said casting surface.

4. The casting system of claim 3 wherein the chill surface is steel or Be-Cu and the conditioning brush is brass.

5. The casting system of claim 3 wherein the chill surface is OFHC copper and the brush is an alloy whose composition is 65Cu-23Zn-12Ni by weight.

6. An improved method for rapidly solidifying a metal on a moving chill surface said improvement comprising the steps of:
 selecting a conditioning brush which will deposit metal on said chill surface; and contacting the chill surface with said conditing brush with sufficient pressure to establish a detectable deposit.

7. The method of claim 6 wherein said detectable deposit is visible.

* * * * *